United States Patent
Noble et al.

(10) Patent No.: US 6,547,250 B1
(45) Date of Patent: Apr. 15, 2003

(54) SEAL ASSEMBLY WITH TWO SEALING MECHANISMS FOR PROVIDING STATIC AND DYNAMIC SEALING

(75) Inventors: Stephen D. Noble, West Vancouver (CA); Thomas Brook, Vancouver (CA); Bruce Muehlchen, Vancouver (CA)

(73) Assignee: Westport Research Inc., Vancouver (CA)

( * ) Notice: Subject to any disclaimer, the term of this patent is extended or adjusted under 35 U.S.C. 154(b) by 0 days.

(21) Appl. No.: 09/642,950

(22) Filed: Aug. 21, 2000

(51) Int. Cl.[7] ............................................... F16J 15/32
(52) U.S. Cl. ...................... 277/309; 277/311; 277/471; 277/553; 277/932
(58) Field of Search ................................ 277/309, 311, 277/436, 437, 438, 467, 470, 471, 549, 550, 551, 553, 558, 908, 930, 932

(56) References Cited

U.S. PATENT DOCUMENTS

| 3,277,797 A | | 10/1966 | Tyree, Jr. et al. ............ 92/194 |
| 3,361,430 A | | 1/1968 | Reid ........................... 277/26 |
| 3,650,508 A | * | 3/1972 | Kosmala et al. ............. 251/173 |
| 4,102,608 A | * | 7/1978 | Balkau et al. ................ 277/436 |
| 4,108,447 A | * | 8/1978 | Scholin ....................... 277/553 |
| 4,138,183 A | * | 2/1979 | Soos ........................... 439/161 |
| 4,396,362 A | | 8/1983 | Thompson et al. |
| 4,813,342 A | | 3/1989 | Schneider et al. ............ 92/207 |
| 5,163,692 A | | 11/1992 | Schofield et al. |
| 5,328,177 A | * | 7/1994 | Lair et al. ................... 277/311 |
| 5,433,453 A | | 7/1995 | Dalton ........................ 277/26 |
| 5,799,953 A | | 9/1998 | Henderson |
| 5,979,904 A | | 11/1999 | Balsells |
| 5,984,316 A | | 11/1999 | Balsells |
| 5,992,856 A | | 11/1999 | Balsells et al. |
| 5,996,472 A | | 12/1999 | Nguyen et al. |
| 6,006,525 A | | 12/1999 | Tyree, Jr. |
| 6,065,754 A | * | 5/2000 | Cromer et al. ............... 277/412 |

* cited by examiner

*Primary Examiner*—Anthony Knight
*Assistant Examiner*—Vishal Patel
(74) *Attorney, Agent, or Firm*—McAndrews, Held & Malloy, Ltd.

(57) ABSTRACT

A seal assembly for providing sealing between a movable cylindrical body and a housing body comprises separate sealing mechanisms for providing static and dynamic sealing. The seal assembly is associated in fixed relationship with either the cylindrical body or the housing body and provides a static seal with the body it is associated with and a dynamic seal with the body that moves relative to the seal assembly. The static sealing mechanism is temperature-activated so that within the operating temperature range, a metallic member of the static seal mechanism is pressed tightly against the associated body to provide a fluid tight static seal. The temperature-activation is caused by the metallic member having a different thermal expansion coefficient than the associated body. The dynamic seal may employ known dynamic sealing mechanisms such as spring-energized seals, interference fit seals, and/or temperature-activated seals.

31 Claims, 2 Drawing Sheets

SEAL ASSEMBLY WITH TWO SEALING MECHANISMS FOR PROVIDING STATIC AND DYNAMIC SEALING

FIELD OF THE INVENTION

The present invention is generally directed to a seal assembly and is more particularly directed to a seal assembly with two separate sealing mechanisms that cooperate with one another to provide static and dynamic sealing.

BACKGROUND OF THE INVENTION

A seal assembly for providing sealing between a movable cylindrical body and a housing body comprising a bore requires both static and dynamic sealing mechanisms. The seal assembly is normally associated with either the movable body or the housing body. That is, the seal assembly is normally in a fixed relationship with one of the bodies and provides a static seal with that body. A dynamic seal is normally provided against the other body, which is movable relative to the seal assembly.

Such conventional seal assemblies are employed for example, between reciprocating or rotating shafts disposed within a bore provided in a housing, or between a reciprocating piston and a cylinder. Conventional seal assemblies are disposed in an annular space between the movable body and the housing body and typically employ the same sealing mechanism for providing both static and dynamic sealing.

U-shaped spring-energized shaft seals are well known as disclosed, for example, in U.S. Pat. Nos. 5,163,692, 5,799,953, 5,979,904, 5,984,316 and 5,992,856.

The '692 Patent, the '953 Patent, and the '904 Patent all disclose U-shaped spring-energized seals that rely upon a spring disposed between two flanges to bias the flanges from one another to enable both static and dynamic sealing. The '316 Patent discloses a seal assembly with a spring that energizes a dynamic seal and a static seal that relies upon an interference fit of a flange between the housing and a metal band. The '856 Patent discloses a seal assembly with independent static and dynamic sealing mechanisms, but both sealing mechanisms are spring-energized.

A particularly difficult application for such seal assemblies is cryogenic applications. A seal assembly employed in a cryogenic apparatus is subjected to an operating environment that is distinct from the operating environment of a non-cryogenic apparatus. A cryogenic operating environment is unique in many ways, including, for example, the effects of thermal contraction, the distinctive physical properties of cryogenic liquids, such as their high compressibility and volatility, and the effect of low temperatures on material properties and sealing capabilities. "Low" temperatures in the context of cryogenic applications are defined herein as temperatures below 190 degrees Kelvin where fluids such as nitrogen, oxygen, argon, methane, hydrogen and natural gas are in the liquid state.

At such low temperatures, fluoropolymers such as, for example polytetrafluoroethylene or polychlorotrifluoroethylene, which are typical materials used for the U-shaped body of conventional seal assemblies, shrink more than the typical metallic materials employed for housings and shafts, thereby often resulting in a tight seal against the shaft or piston and leakage problems between the seal and the housing bore or cylinder.

In cryogenic apparatus such as pumps, the seal assembly may also be subjected to very high differential pressures. For example, for a seal between the housing and the shaft of a cryogenic reciprocating pump, the differential pressure acting on the seal assembly may be higher than 5000 psi (34 MPa).

U.S. Pat. No. 5,996,472 discloses a cryogenic reciprocating pump that employs a U-shaped spring-energized seal assembly for sealing between a piston and the piston cylinder. The seal assembly is employed in combination with a plurality of separate piston rings that have underlying expander rings to press the piston rings against the interior surface of the cylinder. The U-shaped spring-energized seal, like other conventional spring-energized seals, relies upon a spring disposed between two flanges to press the seal against the interior surface of the housing. As temperature decreases and the effects of differential thermal expansion coefficients cause the seal material to shrink more than the housing, and the effectiveness of the seal is reduced.

The term "thermal expansion coefficient" is defined herein as the ratio of the change of size of an object to its original size per unit temperature rise. In the context of annular seal assemblies, changes in the "size" of an annular seal member result in a change in the inner and outer diameter. That is, as the temperature of an annular object is decreased, the inner and outer diameters will also decrease. Such dimensional changes will be greater for objects with higher thermal expansion coefficients.

Accordingly, there is a need for a seal assembly suitable for providing sealing between a movable body such as a shaft or piston and a relatively stationary housing or cylinder. In addition, there is a need for a seal assembly that is suitable for providing sealing in a cryogenic apparatus that compensates for thermal effects at low temperatures and thus reduces the potential for fluid leakage at both the static and dynamic sealing surfaces.

SUMMARY OF THE INVENTION

A seal assembly for providing fluid sealing between a movable inner body and a housing body employs two separate sealing mechanisms for providing static and dynamic sealing. The seal assembly is fixedly associated with one of the bodies, and the seal assembly comprises:
  (a) a static seal for providing a seal between the seal assembly and the associated body; the static seal comprises a metallic member in the shape of a continuous ring wherein the static seal is temperature-activated by the metallic member having a thermal expansion coefficient that is different from that of the associated body. The metallic ring is thereby urged towards the associated body to activate the static seal when the seal assembly is within a predetermined operating temperature range; and
  (b) a dynamic seal for providing a seal between the seal assembly and the body not in a fixed position relative to the seal assembly; the dynamic seal comprises a dynamic seal member in the shape of a continuous ring with at least one flange that cooperates with the static seal to provide a seal between the static and dynamic seal.

In preferred embodiments, when the temperature of the seal assembly is within the predetermined operating temperature range the metallic member forms a static seal by being pressed into direct contact with the associated body.

In one embodiment the associated body is the housing body and the movable inner body is a cylindrical body, such as a reciprocating piston, a piston rod, or a rotating shaft, which is disposed within a hollow cylinder or bore formed within the housing. In this embodiment, the operating temperature range, for example, may be in a range less than 190 degrees Kelvin. Within this operating temperature range the housing shrinks more than the metallic member to cause a temperature-activated static seal. The metallic member may be an alloy that has a thermal coefficient of expansion of less than $1.5 \times 10^{-6}/°F$. and the housing body is made from a material such as stainless steel that has a thermal expansion coefficient of about $9.9 \times 10^{-6}/°F$. The alloy selected for the metallic member may a nickel-iron alloy. In a preferred embodiment the alloy comprises between 34 and 36 per cent nickel, a maximum of 0.12 per cent carbon, a maximum of 0.50 manganese, and a maximum of 0.50 silicon, with the remainder being iron.

In an alternative arrangement, the associated body may be the movable body. In this arrangement, when the operating temperature range is in a range less than 190 degrees Kelvin, within the operating range the metallic ring shrinks more than the movable body to cause a temperature-activated static seal between the seal assembly and the movable body.

In a preferred embodiment the dynamic seal member comprises at least one flange that cooperates with a flange of the metallic member. Preferably at least a portion of the static sealing force applied between the flanges of the dynamic seal member and the metallic member is thermally activated.

In one embodiment the metallic member has a cross-section that is L-shaped with two surfaces facing the associated body and one surface facing the non-associated body. In another embodiment the metallic member has a cross-section that is J-shaped.

The dynamic seal member preferably comprises a fluoropolymer or thermoplastic member. Such materials are suitable for providing a dynamic sealing surface, which has a low coefficient of friction. Examples of suitable thermoplastic or fluoropolymer materials are materials selected from the group consisting of polytetrafluoroethylene, polychlorotrifluoroethylene, and ultra high molecular weight polyethylene.

The metallic member preferably further comprises first and second static seal surfaces that both face in the direction of the associated body. The first static seal surface being closer to the sealing surface of the associated body than the second static seal surface. The dynamic seal member also preferably comprises first and second seal surfaces that both face in the direction of the movable body with the first seal surface being a dynamic seal surface and closer to the sealing surface of the movable body than the second seal surface. A radial static sealing force is applied through the first static seal surface and a radial dynamic sealing force is applied through the dynamic seal surface. A second static seal is provided through cooperation between the respective second seal surfaces of the metallic member and the dynamic seal member (that is, the fluoropolymer or thermoplastic member).

The second static seal surface of the metallic member may further comprises a plurality of ridges. The ridges are oriented substantially perpendicular to the direction of movement of the movable body. For example, when the movable body is a rotating shaft, the ridges would be oriented substantially parallel to the longitudinal axis of the shaft. When the movable body is a reciprocating piston or piston rod, the ridges would be substantially perpendicular to longitudinal axis of the cylinder.

The dynamic seal member preferably further comprises a first flange with a surface facing the non-associated body and a second flange with a surface facing the associated body. A metallic member is preferably disposed between the flanges and applies a radial static sealing force through the second flange. When the seal assembly is subjected to a differential pressure the flanges preferably extend from a side of the dynamic seal member that faces the higher pressure. In this arrangement, the fluid on the high pressure side helps to urge the flanges outward for better sealing against the adjacent bodies.

In one embodiment, the metallic member of the static seal is not in direct contact with the associated body. For example, the metallic member may apply a radial static sealing force through an adjacent flange of the dynamic seal member while a spring member applies a mechanical sealing force to an opposite dynamic seal member flange that contacts the non-associated body.

The seal assembly of claim 15 wherein the dynamic seal member applies a radial sealing force outside the predetermined operating temperature range by being sized to provide an interference fit between the dynamic seal and the non-associated body.

A method for providing a fluid seal between a movable inner body and a housing body, is disclosed wherein a seal assembly is associated with one of the bodies by being in a fixed relationship thereto, the method comprising:

(a) thermally activating a static seal between the seal assembly and the associated body by employing a static seal element that has a different thermal expansion coefficient than the associated body, whereby the static seal element is urged towards the associated body when the seal assembly is within a predetermined operating range; and (b) mechanically activating a dynamic seal between a dynamic seal element of the seal assembly and the body not in a fixed position relative to the seal assembly; and (c) thermally activating a static seal between the static seal element and the dynamic seal element.

In a preferred method the operating temperature range is in a range less than 190 degrees Kelvin and within the operating temperature range the associated body shrinks more than the static seal member.

At least a portion of the mechanical forces for activating the dynamic seal may be provided by a spring member. In the alternative, or in addition to the spring member, the dynamic seal member may further comprise a resilient member that is sized to provide an interference-type seal that provides at least a portion of the mechanical forces for activating the dynamic seal.

DETAILED DESCRIPTION OF PREFERRED EMBODIMENT(S)

The present seal assembly may be employed to provide sealing in an annular space between a movable cylindrical body and a housing body in any temperature range. The seal assembly relies upon a combination of two separate sealing mechanisms to seal against fluid leakage through the annular space. A temperature-activated static seal is applied to the body associated with the seal assembly and a conventional dynamic seal is applied to the other body. For example, the dynamic seal may employ a spring-energized annular seal or an interference fit annular seal, or a combination of both.

The static seal comprises a member that is formed from a material that has a different thermal expansion coefficient than the housing so that the static seal member and the housing are urged towards each other when the seal assembly is within a predetermined operating temperature range. In a preferred embodiment, the static seal member is formed from a metallic material such as a nickel iron alloy.

For example, for a seal assembly associated with a housing and that is intended for low temperature applications, the static seal comprises a metallic member having a thermal expansion coefficient less than that of the housing. When the seal assembly is cooled to a predetermined operating temperature range, the metallic member shrinks less than the housing and the metallic member and the housing are urged towards each other, thereby generating a radial static sealing force.

Conversely, a seal assembly associated with a housing that is intended for high temperature applications, the static seal comprises a metallic member having a thermal expansion coefficient greater than that of the housing. When the seal assembly is heated to within a predetermined operating temperature range, the metallic member expands more than the housing and the metallic member and the housing are urged towards each other, thereby generating a radial static sealing force.

For a seal assembly associated with a housing and that is intended for applications where the seal assembly is expected to operate at or close to ambient temperature conditions, a metallic member with a thermal expansion coefficient greater than that of the housing can be cooled during the assembly process so that the seal assembly can be positioned in the housing. When the metallic member returns to ambient temperatures the metallic member will expand and the metallic member will be urged against the housing, thereby generating a radial static sealing force.

While the above description relates to static seals formed between the seal assembly and the housing, the same principle of a temperature-activated static seal can be employed when the static seal is applied to the movable body, in which case the material for the metallic member will have a significantly different thermal expansion coefficient compared to that of the material of the movable body.

Figure 1:
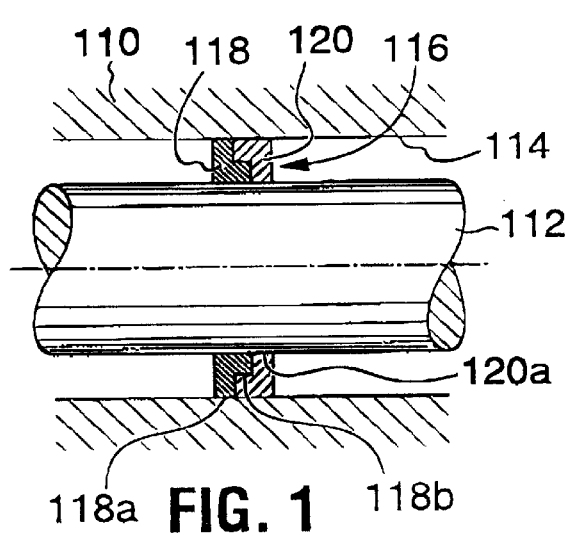
FIG. 1 is a cross-sectional view of an embodiment of a temperature-activated seal assembly for providing a static seal between the seal assembly and a housing and dynamic seal between the seal assembly and a shaft.

Referring now to particular embodiments of the seal assembly, FIG. 1 shows a cross-sectional view of housing 110 with cylindrical shaft 112 disposed within bore 114 provided within housing 110. Shaft 112 is typically metallic and it may reciprocate and/or rotate within housing 110. Seal assembly 116 is disposed in an annular space between shaft 112 and housing 110 to provide a seal against fluid leakage therethrough.

In the embodiment of FIG. 1, seal assembly 116 comprises metallic member 118 and dynamic seal member 120. Metallic member 118 is in the shape of a continuous ring with an L-shaped cross-section. Metallic member 118 has a significantly different thermal expansion coefficient than housing 110 so that within a predetermined operating temperature range, outward facing surface 118a of metallic member 118 applies a radial static sealing force by being urged against the interior surface of housing 110. For example, for low temperature applications, metallic member 118 will have a thermal expansion coefficient significantly lower than that of housing 110. An example of a suitable material for metallic member 118 for low temperature applications is a nickel-iron alloy sold under the tradename INVAR, which has a composition of 34.5–36% nickel, 0.12% (maximum) carbon, 0.50% (maximum) Manganese, 0.50% (maximum) silicon, and with the remainder being iron. At temperatures between 150 and 273 degrees Kelvin, INVAR has a thermal expansion coefficient of about $1.1 \times 10^{-6}/°F$. (about $2.0 \times 10^{-6}/°K$). INVAR's thermal expansion coefficient is significantly less than that of stainless steel alloy, which is about $9.9 \times 10^{-6}/°F$. (about $17.8 \times 10^{-6}/°K$). Stainless steel alloys are materials that might be suitable for housing 110. For high temperature applications metallic member 118 is preferably formed from a material that has a thermal expansion coefficient significantly higher than that of housing 110.

In the embodiment of FIG. 1, inward facing surface 120a of dynamic seal member 120 provides dynamic sealing against shaft 112. Dynamic seal member 120 is preferably a fluoropolymer material or a thermoplastic material such as ultra high molecular weight polyethylene (UHMW polyethylene), which is suitable for the anticipated operating environment. Such fluoropolymer and thermoplastic materials typically shrink more than metallic shaft 112 at low temperatures, so for low temperature applications the dynamic seal provided by dynamic seal member 120 is at least partially temperature-activated. There may also be additional radial dynamic sealing forces provided by an interference fit between dynamic seal member 120 and housing 110 and shaft 112. For low temperature applications, dynamic seal member 120 preferably also has a thermal expansion coefficient that is significantly higher than metallic member 118 so that when seal assembly 116 is cooled to the operating temperature range, dynamic seal member 120 shrinks to seal tightly against lip surface 118b of metallic member 118. Conversely, for high temperature applications, metallic member 118 preferably has a higher thermal expansion coefficient than dynamic seal member 120 so that lip surface 118b is pressed against a corresponding lip of dynamic seal member 120 to provide sealing between the static and dynamic seal elements.

To simplify the explanation of the alternative embodiments illustrated in FIGS. 2–5, these embodiments will be described as seal assemblies for low temperature "cryogenic" applications, although it will be understood that the same principles can be applied to seal assemblies operating in other analogous temperature ranges. It will also be recognized that the present invention has particular advantages to cryogenic applications because of the difficulties associated with devices that operate in such low temperature ranges, as noted in the background discussion above.

Figure 2:
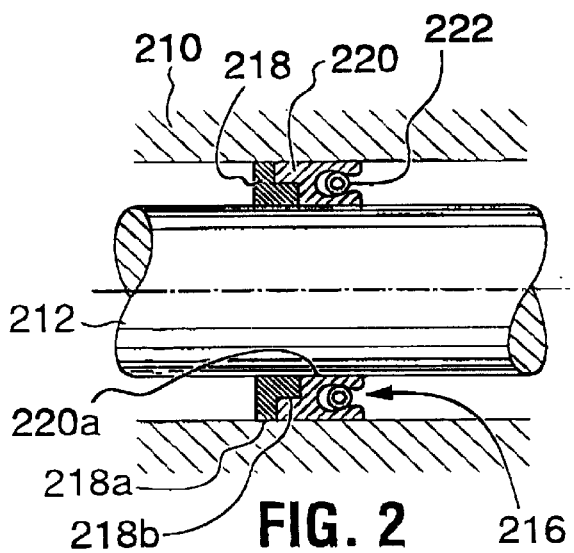
FIG. 2 illustrates an alternative embodiment of the seal assembly of FIG. 1 wherein the dynamic seal further comprises a spring element interposed between two flanges to provide a spring-energized dynamic seal.

In the alternate embodiment illustrated in FIG. 2, seal assembly 216, like other embodiments disclosed herein, comprises separate mechanisms for providing a static seal and a dynamic seal. Metallic member 218 applies radial sealing forces towards housing 210 in the same way as metallic member 118 of FIG. 1. However, the dynamic seal of FIG. 2 further comprises opposing flanges and spring 222 for energizing this dynamic seal. Spring 222 provides an additional radial sealing force for urging the flanges against both shaft 212 and housing 210. However, since metallic member 218 provides sealing between the seal assembly and housing 210, the primary purpose of spring 222 is to enhance the dynamic sealing against shaft 212.

Figure 3:
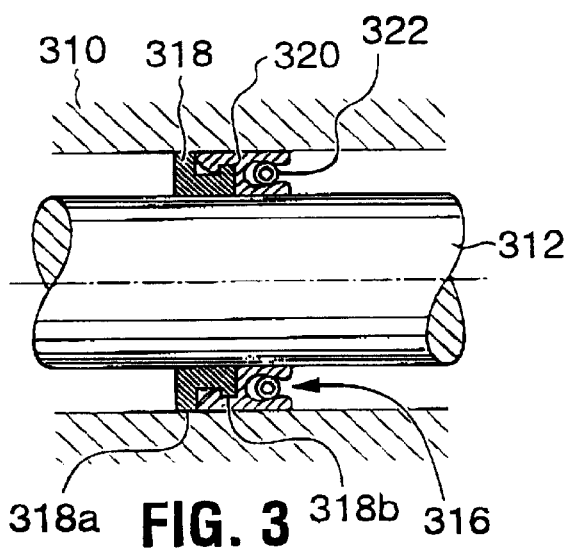
FIG. 3 illustrates a variation on the embodiment of the seal assembly of FIG. 2, in which the static and dynamic seals further comprise interlocking lip edges.

FIG. 3 illustrates an alternative embodiment wherein seal assembly 316 comprises a static seal (provided by metallic member 318) and a dynamic seal (provided by dynamic seal member 320 and spring 322). Like the embodiment of FIG. 2, the dynamic seal of FIG. 3 is spring-energized. Seal assembly 316 additionally comprises interlocking static and dynamic seal elements. That is, overlapping lip 318b and the corresponding flange of dynamic seal member 320 further comprise ridge and groove features that interlock with each other to resist separation of the static seal and dynamic seal that might be caused by reciprocating motion of shaft 312.

In the embodiments of FIGS. 1–3 an important feature of the seal assembly is that the metallic member 118, 218, 318 and the dynamic seal member 120, 220, 320 (respectively) each comprise two sealing surfaces. That is, metallic members 118, 218, 318 each comprises two outward facing surfaces, namely perimeter surfaces 118a, 218a, 318a that statically seal against respective housings 110, 210, 310 and lip surfaces 118b, 218b 318b that seal against inward facing flanges of respective dynamic seal members 120, 220, 320. Likewise, dynamic seal members 120, 220, 320 each have two inward facing sealing surfaces, namely inner sealing surfaces 120a, 220a, and 320a that dynamically seal against respective shafts 112, 212, 312, and an inward facing flange surface that seals against respective lip surfaces 118b, 218b 318b.

Figure 4:
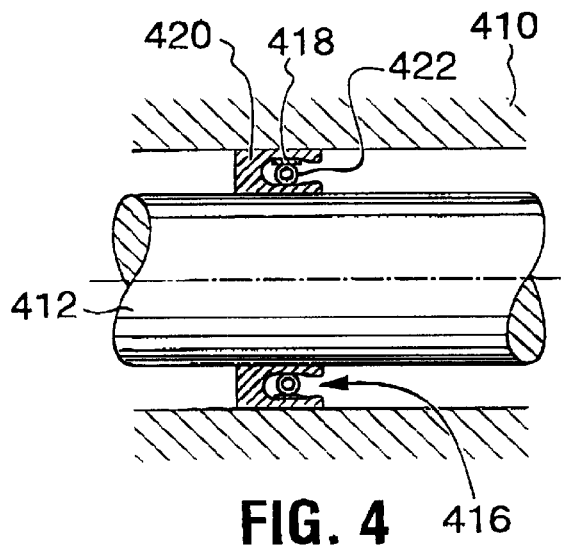
FIG. 4 illustrates another alternative embodiment of the seal assembly, in which a metallic member and a spring are both interposed between the flanges of a dynamic seal body. The metallic member applies a temperature-activated sealing force through the adjacent flange and against the housing and the spring applies a dynamic sealing force against the shaft.

Seal assembly 416, shown in FIG. 4 is different from the embodiments of FIGS. 1–3 in that metallic member 418 is not in direct contact with housing 410. Metallic member 418 is disposed between the opposing flanges of dynamic seal member 420. However, metallic member 418 still functions in the same way as metallic members 118, 218, 318, since it provides a radial static sealing force by having a thermal expansion coefficient that is significantly different from that of the housing. With this arrangement, however, care must be taken so that the static sealing force is not so great as to cause cold flow of the flange interposed between metallic member 418 and housing 410 since this may cause a net reduction in the static sealing force. Seal assembly 416 also comprises a dynamic seal that is energized by spring 422 much in the same way as the spring-energized dynamic seals of the embodiments of FIGS. 2 and 3.

Figure 5:
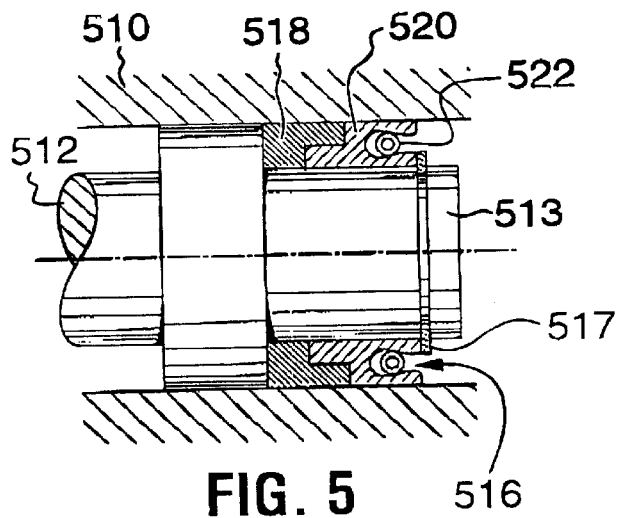
FIG. 5 is a cross-sectional view of an embodiment of a seal assembly for providing a temperature-activated static seal between the seal assembly and a piston and dynamic seal between the seal assembly and a piston cylinder or bore.

FIG. 5 illustrates an embodiment of the seal assembly that is associated with a movable body, which in this example is piston 513. Piston 513 is disposed within a cylinder formed within housing 510. Piston rod 512 may be employed to actuate the reciprocating movement of piston 513. In this example, seal assembly 516 is disposed in an annular recess formed near the end surface of piston 513. Retaining clip 517 ensures that seal assembly 516 does not slide from the end of piston 513. Like the other embodiments, seal assembly 516 comprises a static seal and a dynamic seal. As with the other embodiments, in this embodiment the static seal is temperature-activated. In the embodiment of FIG. 5, when seal assembly 516 is cooled to its operating temperature range, metallic member 518 has a higher thermal expansion coefficient than piston 513 so that metallic member 518 shrinks and is urged towards piston 513. For example, piston 513 may be made from a solid piece of stainless steel which has a thermal expansion coefficient of about $9.9 \times 10^{-6}/°F$. ($17.8 \times 10^{-6}/°K$) and metallic member 518 may be formed from brass or aluminum which have higher thermal expansion coefficients; respectively about $11.6 \times 10^{-6}/°F$. ($20.9 \times 10^{-6}/°K$) for yellow brass which is about 65% copper and 35% zinc; and about $13.1 \times 10^{-6}/°F$. ($23.6 \times 10^{-6}/°K$) for 6061 aluminum.

The dynamic seal is spring-energized to seal against the cylinder walls of housing 510. To improve the effectiveness of the dynamic seal, spring 522 and/or dynamic seal member 520 may be formed from materials that have lower expansion coefficients than the housing material so that when housing 510 shrinks at low temperatures (that is, within the operating temperature range of seal assembly 516), housing 510 will be urged towards dynamic seal member 520 and spring 522.

Figure 6:
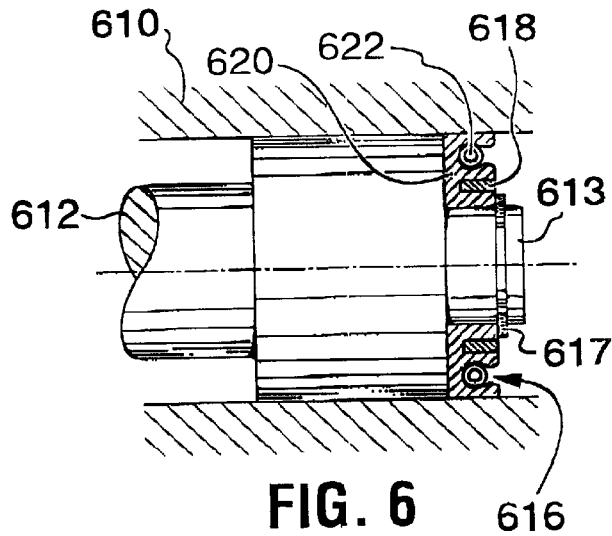
FIG. 6 is a cross-sectional view of an alternative embodiment of a seal assembly that is associated with a piston that comprises a temperature-activated static seal between the seal assembly and the piston and a hybrid temperature-activated and spring-energized dynamic seal between the seal assembly and the housing.

FIG. 6 shows seal assembly 616, which comprises a temperature-activated static seal between seal assembly 616 and piston 613 and a temperature-activated dynamic seal between seal assembly 616 and housing 610. Metallic member 618 is formed from a material that has a thermal expansion coefficient that is significantly lower than that of piston 613 and housing 610. For example, metallic member 618 may be formed from INVAR and piston 613 and housing 610 may be formed from stainless steel. At low temperatures metallic member 618 shrinks less than piston 613 and housing 610, so that within the operating temperature range of seal assembly 616 housing 610 is urged towards metallic member 618. The dynamic seal further comprises dynamic seal member 620 and spring 622 disposed between metallic member 618 and housing 610. The differential thermal expansion causes housing 610 to shrink towards seal assembly 616, thereby helping to energize the dynamic seal.

Dynamic seal member 620 has a significantly higher thermal expansion coefficient than piston 613 and metallic member 618. Accordingly, when seal assembly 616 is within the predetermined operating temperature range, dynamic seal member 620 will be urged against piston 613 and metallic member 618, to apply a static temperature-activated sealing force.

Another feature of the embodiments of FIGS. 5 and 6 is that the flanges of the dynamic seal members extend towards the compression chamber of piston 513 and 613 respectively. Therefore, during the compression stroke, when the differential pressure applied to seal assemblies 516 and 616 is greatest, the dynamic seal flanges extend in the direction of the higher pressure which helps to urge the flanges apart to improve sealing.

Figure 7:
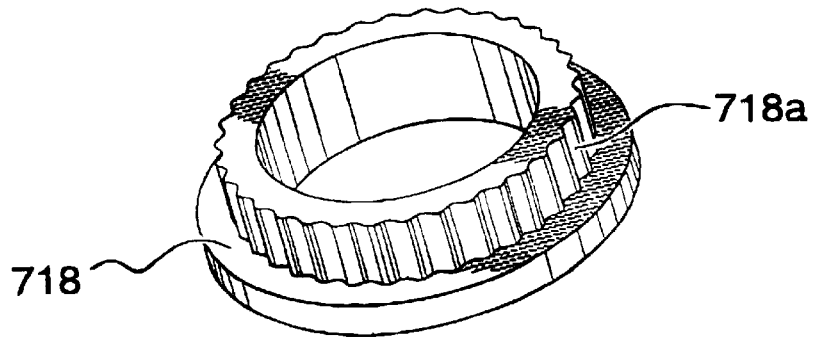
FIG. 7 is a perspective view of a metallic member for a static seal that comprises ridges formed in a surface that engages a corresponding surface of the dynamic seal (not shown), in which the ridges help to prevent rotation of the dynamic seal when, for example, the movable body is a rotatable shaft.

FIG. 7 is a perspective view of metallic member 718 for a static seal such as the ones depicted in FIGS. 1 and 2. Lip surface 718b comprises ridges or teeth that have axes oriented parallel to the longitudinal axis of the shaft. Such ridges or teeth may engage with similar features on the inward facing surface of a dynamic seal member (not shown) to provide extra resistance against rotation of the dynamic seal member when it is employed to apply a dynamic seal to the surface of a rotating shaft.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A seal assembly for providing fluid sealing between an inner body and a housing body, wherein one of said bodies is movable relative to the other body and said seal assembly is fixedly associated with one of said bodies defined herein as a fixedly-associated body, with the other one of said bodies defined herein as a non-fixedly-associated body, said seal assembly comprising:
   (a) a static seal for providing a seal between said seal assembly and said fixedly-associated body, said static seal comprising a metallic member in the shape of a ring wherein said static seal is temperature-activated by said metallic member having a thermal expansion coefficient that is different from that of said fixedly-associated body, whereby said metallic member is urged towards said fixedly-associated body to activate said static seal when said seal assembly is within a predetermined operating temperature range; and
   (b) a dynamic seal for providing a seal between said seal assembly and said non-fixedly-associated body when said non-fixedly-associated body is moving relative to said fixedly-associated body, said dynamic seal comprising a dynamic seal member in the shape of a continuous ring with at least one flange that cooperates with said static seal to provide a seal between said static seal and said dynamic seal.

2. The seal assembly of claim 1 wherein said fixedly-associated body is said housing body.

3. The seal assembly of claim 2 wherein said predetermined operating temperature range is in a range less than 190 degrees Kelvin and by reducing the temperature of said seal assembly to said predetermined operating temperature range said metallic member shrinks less than said housing body to cause a temperature-activated static seal.

4. The seal assembly of claim 3 wherein said metallic member is an alloy that has a thermal coefficient of expansion of less than $1.5 \times 10^{-6}/°F$.

5. The seal assembly of claim 4 wherein said alloy is a nickel-iron alloy.

6. The seal assembly of claim 4 wherein said alloy comprises between 34 and 36 per cent nickel, a maximum of 0.12 per cent carbon, a maximum of 0.50 manganese, a maximum of 0.50 silicon, and with the remainder being iron, wherein such percentages are expressed in terms of weight.

7. The seal assembly of claim 4 wherein said housing body is formed from stainless steel.

8. The seal assembly of claim 1 wherein said associated body is said movable body.

9. The seal assembly of claim 8 wherein said operating temperature range is in a range less than 190 degrees Kelvin and within said operating range said metallic ring shrinks more than said moving cylindrical body to cause a temperature-activated static seal.

10. The seal assembly of claim 1 wherein said predetermined operating temperature range is in a range lower than 190 degrees Kelvin.

11. The seal assembly of claim 1 wherein said at least one flange of said dynamic seal member cooperates with a flange of said metallic member.

12. The seal assembly of claim 11 wherein said metallic member has a cross-section that is L-shaped with two surfaces facing said associated body and one surface facing said non-associated body.

13. The seal assembly of claim 11 wherein said metallic member has a cross-section that is J-shaped.

14. The seal assembly of claim 1 wherein said inner body is cylindrical in shape.

15. The seal assembly of claim 14 wherein said dynamic seal member comprises a fluoropolymer or thermoplastic member.

16. The seal assembly of claim 15 wherein said metallic member further comprises first and second static seal surfaces that both face in the direction of said associated body with said first static seal surface being closer to the sealing surface of said associated body than said second static seal surface, and said dynamic seal member comprises first and second seal surfaces that both face in the direction of said movable body with said first seal surface being closer to the sealing surface of said movable body than said second seal surface, wherein a radial static sealing force is applied through said first static seal surface, a radial dynamic sealing force is applied through said first dynamic seal surface, and said second static seal surface of said metallic member and said second seal surface of said dynamic seal member face each other and cooperate to provide a static seal between said static seal member and said dynamic seal member.

17. The seal assembly of claim 15 wherein said dynamic seal member comprises a first flange with a surface facing said non-fixedly-associated body and a second flange with a surface facing said fixedly-associated body and said metallic member is disposed between said flanges and applies a radial static sealing force through said second flange.

18. The seal assembly of claim 17 wherein a differential pressure is applied to said seal assembly and said flanges extend from a side of said dynamic seal member that faces the higher pressure.

19. The seal assembly of claim 17 wherein said dynamic seal is spring-energized and a spring is disposed between said metallic member and said first flange for applying a radial dynamic sealing force against said non-fixedly-associated body through said first flange.

20. The seal assembly of claim 19 wherein said metallic member applies a radial static sealing force through said second flange of said dynamic seal member and a spring member applies a mechanical sealing force to said first flange of said dynamic seal member.

21. The seal assembly of claim 15 wherein said dynamic seal member applies a radial sealing force outside the predetermined operating temperature range by being sized to provide an interference fit between said dynamic seal and said non-fixedly-associated body.

22. The seal assembly of claim 15 wherein said dynamic seal member is formed from a thermoplastic or fluoropolymer material selected from the group consisting of polytetrafluoroethylene, polychlorotrifluoroethylene, and ultra high molecular weight polyethylene.

23. The seal assembly of claim 1 wherein when the temperature of said seal assembly is within said predetermined operating temperature range said metallic member forms a static seal by being pressed into direct contact with said associated body.

24. The seal assembly of claim 14 wherein said inner body is a piston or piston rod and said housing body is a cylinder or bore.

25. The seal assembly of claim 16 wherein said second static seal surface of said metallic member further comprises a plurality of ridges.

26. The seal assembly of claim 25 wherein said ridges are oriented substantially perpendicular to the direction of movement of said movable body.

27. A method of providing a fluid seal between an inner body and a housing body, wherein one of said bodies is movable relative to the other body and a seal assembly is associated with one of said bodies, defined herein as a fixedly associated body, with the other one of said bodies defined herein as a non-fixedly-associated body, said method comprising:

(a) thermally activating a static seal between said seal assembly and said fixedly-associated body by employing a static seal element that has a different thermal expansion coefficient than said fixedly-associated body whereby said static seal element is urged towards said fixedly-associated body when said seal assembly is within a predetermined operating range; and (b) mechanically activating a dynamic seal between a dynamic seal element of said seal assembly and said non-fixedly-associated body, wherein said dynamic seal is activated when said non-fixedly-associated body is moving relative to said fixedly-associated body.

28. The method of claim 27 wherein said predetermined operating temperature range is in a range less than 190 degrees Kelvin and within said predetermined operating temperature range said fixedly-associated body shrinks more than said static seal member.

29. The method of claim 27 wherein a spring member is employed to provide at least a portion of the mechanical forces for activating said dynamic seal.

30. The method of claim 27 wherein said dynamic seal member is resilient and sized to provide an interference-type seal that provides at least a portion of the mechanical forces for activating said dynamic seal.

31. The method of claim 27 further comprising thermally activating a static seal between said static seal element and said dynamic seal element.

* * * * *